United States Patent [19]
Evans

[11] Patent Number: 5,614,884
[45] Date of Patent: Mar. 25, 1997

[54] VEHICLE TURN SIGNAL

[76] Inventor: Harold A. Evans, 10 Merrymount Dr., Swampscott, Mass. 01907

[21] Appl. No.: 466,228

[22] Filed: Jun. 6, 1995

Related U.S. Application Data

[63] Continuation of Ser. No. 40,413, Mar. 31, 1993, Pat. No. 5,438,314.

[51] Int. Cl.⁶ ............................................. B60Q 1/40
[52] U.S. Cl. ....................... 340/477; 340/468; 340/475; 340/309.15; 200/61.27
[58] Field of Search ................. 340/477, 309.15, 340/468, 476, 425, 426, 478, 475; 200/61.27, 61.32

[56] References Cited

U.S. PATENT DOCUMENTS

| | | | |
|---|---|---|---|
| 3,641,490 | 2/1972 | Kawai | 340/476 |
| 4,254,397 | 3/1981 | Shannan | 340/477 |
| 4,438,425 | 3/1984 | Tsuchida et al. | 340/476 |
| 4,638,290 | 1/1987 | Wagner | 340/476 |

*Primary Examiner*—Jeffery Hofsass
*Assistant Examiner*—Edward Lefkowitz
*Attorney, Agent, or Firm*—Cesari and McKenna, LLP

[57] ABSTRACT

A directional indicator system for vehicles such as automobiles comprises a flasher unit and left hand and right hand marker lamps positioned on the vehicle. The flasher unit causes current to pulse through the marker lamps so that the marker lamps flash. Transmission of current to the marker lamps from the flasher unit is controlled by a timer circuit. The timer circuit includes switches that enables selection of one of the left hand and right hand marker lamps and then provide current to the selected left hand or right hand marker lamps for a predetermined duration. A plurality of timers can be provided and a plurality of time durations can be selected. The system can further comprise a complete turn shut-off switch that prematurely ends the operating duration of the timer circuit when a turn of sufficient radius is completed.

6 Claims, 6 Drawing Sheets

VEHICLE TURN SIGNAL

This is a continuation of application Ser. No. 08/040,413 filed on Mar. 31, 1993 U.S. Pat. No. 5,438,314.

FIELD OF THE INVENTION

This invention relates to a vehicle turn signal and more particularly to an automotive turn signal having timed shut-off.

BACKGROUND OF THE INVENTION

As automobile technology has advanced through the years, a variety of automobile systems have been improved to take advantage of technological innovations. Crank-operated windows have given way to motor-driven windows, manual brakes have given way to power brakes and, more recently, to anti-lock braking mechanisms, advanced cruise control mechanisms now supplement the accelerator and brake pedals and a variety of other convenience-enhancing improvements have been implemented. However, certain controls have remained unchanged for almost half a century. The directional indicator, more commonly termed the "turn signal", for example, utilizes a control is essentially the same mechanism that was introduced several decades ago.

Such a turn signal control is shown in FIG. 1 which details the driver's side of a conventional automobile passenger compartment 20. A steering wheel 24 mounted on a steering column 26 is shown along with an instrument cluster 28, dashboard 30, windshield 32 and center console 34. The turn signal is controlled by a steering column-mounted control stalk 36 that moves pivotally upwardly and downwardly as depicted by the arrow 38.

The control stalk 36 actuates a set of mechanical switches (not shown) inside the steering column 26 so that upward (clockwise) movement causes a right turn signal switch to be activated and downward movement (counterclockwise) causes a left turn signal switch to be activated. When a given switch is activated, it closes a circuit on a flasher unit comprising, generally, a bimetallic switch that alternately opens and closes the circuit in order to provide a reciprocating on/off current to front and rear exterior turn signal marker lights (not shown). The circuit also includes, typically, one or two dashboard mounted indicator lights 40 and 42 that flash in conjunction with the exterior marker lights. In this example, a left hand indicator light 40 and a right hand indicator light 42 are located on opposite sides of the instrument cluster 28. Each indicator light 40 and 42 flashes independently when a given turn is indicated and usually takes the form of an arrow symbolizing the corresponding turn direction.

The conventional control stalk 36 depicted in FIG. 1 is constructed so that it remains in an upward or downward actuated position (thus, activating a respective set of exterior turn signal marker lights) until it is returned to the neutral, center or "off" position (as shown). Like virtually all modern automobile steering columns, this column 26 is contemplated as being mechanically interconnected with the turn signal control stalk, so that, the stalk is automatically returned to neutral after a turn is completed. In conducting a vehicle turn, a driver typically places the turn signal into one of its actuated positions to signal either a left or right turn. The driver then turns the steering wheel 24 to cause the vehicles front wheels (not shown) to point in the direction of the turn. The turn signal control stalk 36 is interconnected in such a manner that the turning of the steering wheel 24 into the turn does not affect the actuation of the turn signal control stalk 36. However, as the turn is completed, and the wheel 24 returns to a "straight" steering orientation, a return linkage (not shown) within the steering column 26 forces the control stalk 36 back into a neutral position, thus deactivating the turn signal.

The mechanical interconnection between the turn signal control stalk 36 and the steering column 26 is generally effective for wide turns. However, narrower turns, or lane changes do not typically require a sufficient enough rotation of the steering wheel 24 to activate the return linkage and, thus, the signal control stalk 36 remains in an actuated, or "on", position until manually brought back to neutral. A particular disadvantage of such a system is that drivers may not always be aware that the turn signal is still in operation after completing a maneuver. As such, the continuing operation of the turn signal may pose a danger to other drivers who cannot accurately determine or predict whether the vehicle intends to perform further turning maneuvers. This problem is particularly exacerbated in high speed highway driving situations.

Additionally, over time, the mechanical interconnection between the turn signal control stalk 36 and the steering column 26 may wear, thus preventing reliable return of the control stalk 36 to its neutral, or "off", position, following even sharp turns.

In view of the disadvantages of a conventional turn signal control design, it is an object of this invention to provide a turn signal control with more reliable shut-off even after shallow turns. It is a further object of this invention to provide a turn signal control that is less prone to mechanical wear over time and exhibits increased reliability. Such a turn signal control should also be ergonomically designed to provide greater ease of use.

SUMMARY OF THE INVENTION

A directional indicator system for vehicles such as cars provides a flasher unit and left hand and right hand marker lamps. The flasher unit is typically powered by a battery mounted in the vehicle. The left hand and right hand marker lamps are typically located at each of the four exterior corners of the vehicle. The system according to this invention includes a timer circuit that enables the user to select a predetermined duration in which the flasher unit provides a current to a given set of marker lamps. Typically, the user selects between the left hand and right hand sets of marker lamps on the vehicle.

In the preferred embodiment, the directional control circuit comprises four switch/timer blocks that are arranged in pairs. One pair of switch/timer blocks are interconnected with the left hand marker lamps while the other pair of switch/timer blocks are connected with the right hand marker lamps. Each switch/timer block provides a predetermined duration in which current from the flasher is routed to the respective marker lamps.

According to one embodiment, there is provided a 15 second and a 70 second timer block for each pair. The switch/timer blocks according to this invention can comprise conventional 555 timer chips or can be implemented in a software based system or by other forms of control circuitry.

According to one embodiment, the switch/timer block pairs can be interconnected so that activating a given switch/timer in a pair deactivates an operating switch/timer in the other pair. In this manner, the user is insured that only one side of the vehicle is illuminated at any one time. The system according to this embodiment can further comprise a completed turn shut-off switch that de-energizes or, otherwise, deactivates the switch/timers prematurely if a wide turn is completed.

According to one preferred embodiment, each switch/timer is activated by a discrete switch. The switches can be located upon opposing sides of the steering wheel hub adjacent the steering wheel rim. Accordingly, when a user desires to signal a turn, he or she need only move a finger from the wheel rim onto the chosen switch to activate the timed signal. The system can be constructed so that activation of switches on both sides of the hub simultaneously causes the timers to reset, thus, deactivating both signals. The switches can include LED or equivalent illumination that indicates when a timed signal is operating.

According to an alternative embodiment, the switch/timers can be incorporated into a more conventional control stalk. The control stalk can be operated so that a momentary clockwise or counterclockwise pivoting of the stalk causes activation of the timer. The control stalk can be constructed so that more than one time can be selected by, for example, tapping the stalk twice in a given direction or by holding the stalk for a short or long duration.

According to another alternative embodiment, a single timer can be utilized in which a given time duration and side of the vehicle is selected by routing the circuit to the appropriate side and inputting a predetermined time value to the timer. Similarly, timers can include a variable resistance that allows the user to more precisely adjust the exact duration of the timed signal.

BRIEF DESCRIPTION OF THE DRAWINGS

The foregoing and other objects and advantages of the invention will be more clear with reference to the following detailed description as illustrated by the drawings, in which.

DETAILED DESCRIPTION

Figure 1:
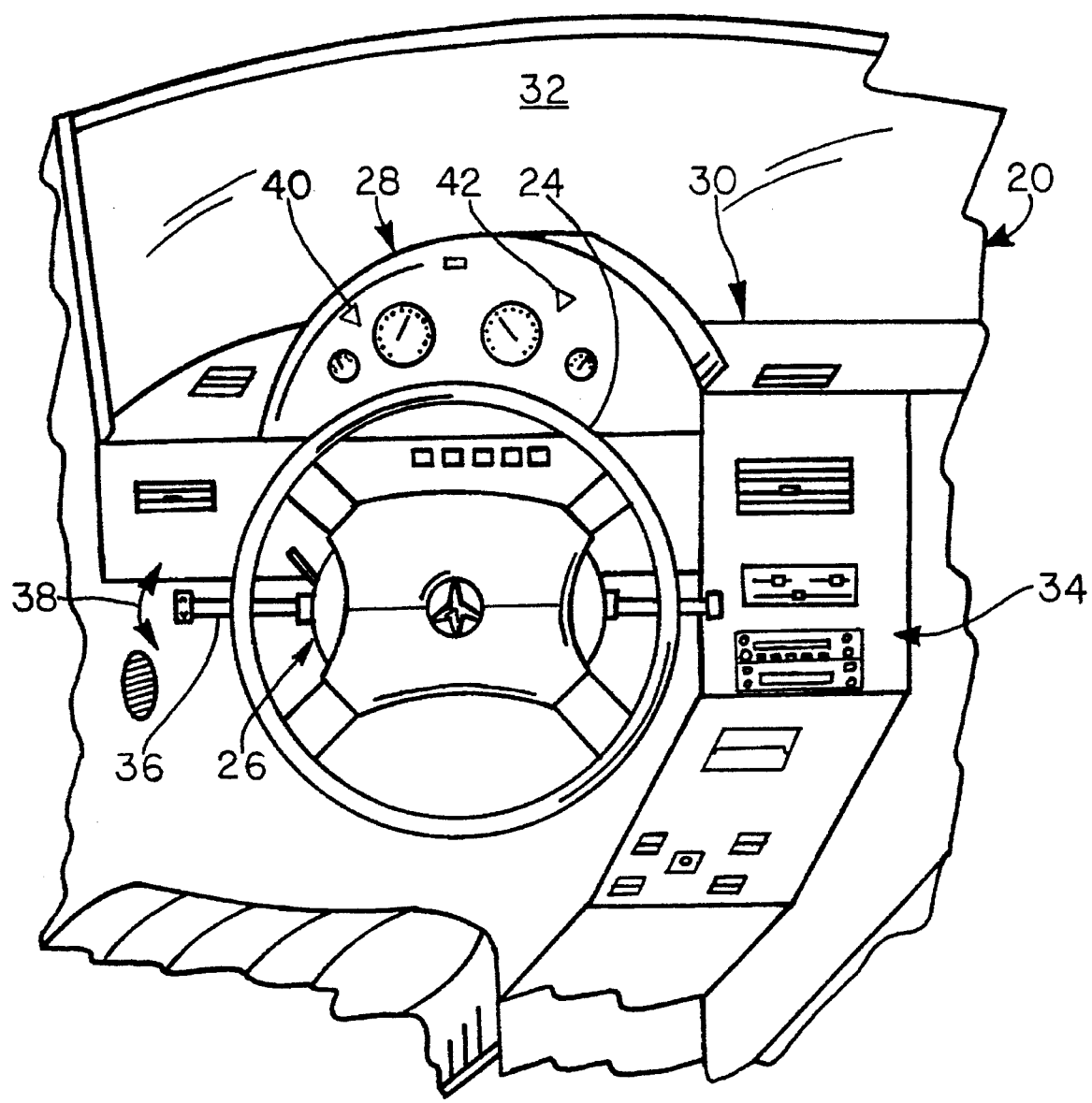
FIG. 1 is a perspective view of the driver's side of a passenger compartment including an instrument cluster having a turn signal control mechanism according to the prior art.
Figure 2:
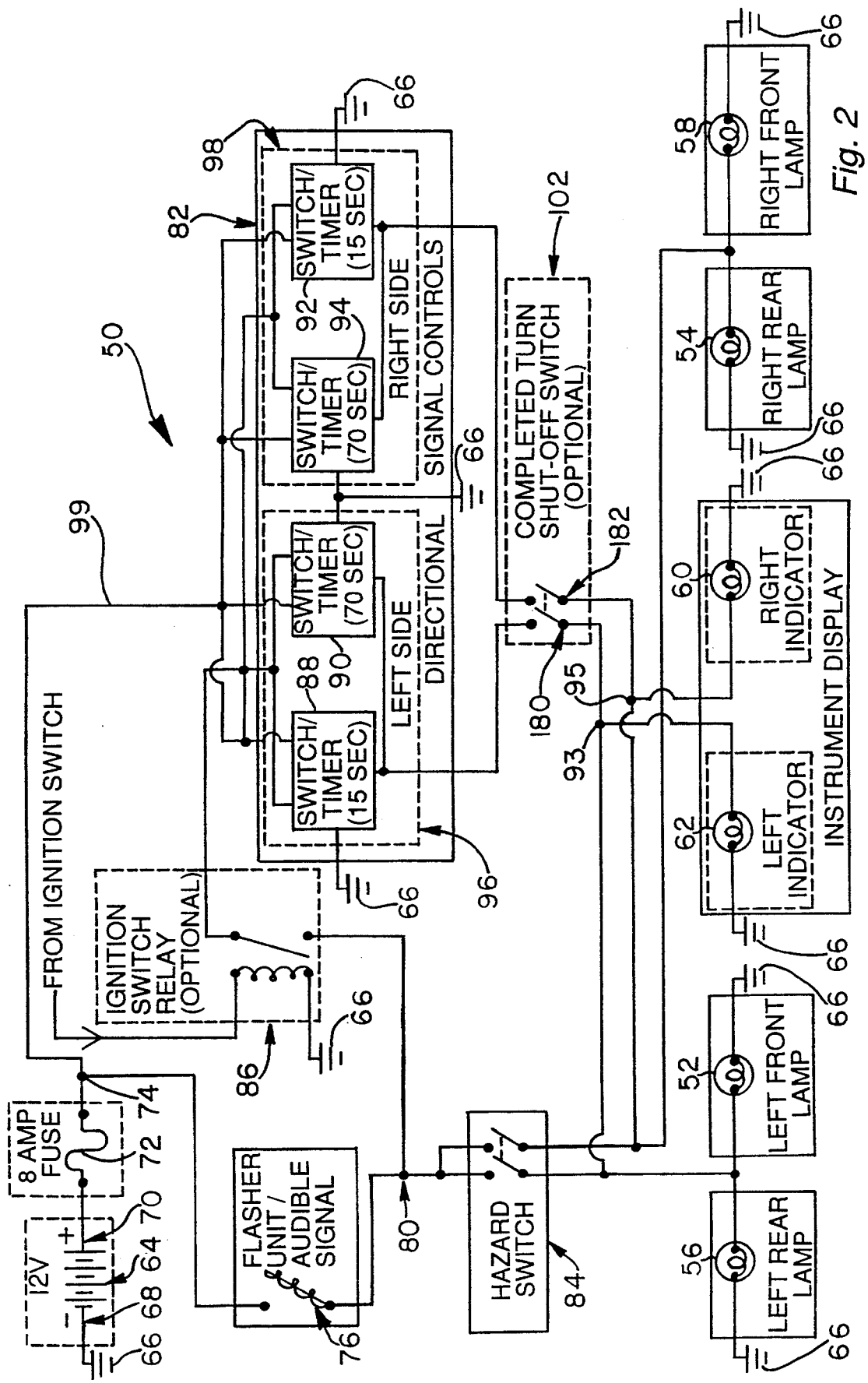
FIG. 2 is a schematic diagram of a turn signal control system according to this invention.

A schematic diagram of a turn signal control system according to this embodiment is depicted in FIG. 2. A variety of turn signal circuits can be utilized according to this invention. Hence, the particular illustration of power supplies and voltages, flasher units, relays and fusing according to this embodiment is only illustrative, and can vary based upon vehicle specifications and requirements. The depicted turn signal system circuit 50 includes left side and right side vehicle marker lamps for the front 52 and 54, respectively and the rear 56 and 58, respectively. These marker lamps 52, 54, 56 and 58 are typically located at each of the four corners of the vehicle (not shown). The circuit further includes left and right indicator lamps 60 and 62, respectively, that, as depicted in FIG. 1, are usually located on the dashboard instrument cluster, or in close proximity thereto. The circuit 50 is powered by a 12-volt wet cell rechargeable battery 64 of the type normally found in an automobile according to this embodiment. The battery 64 is grounded to a common ground 66, typically connected to the negative battery terminal 68. The positive battery terminal 70 is interconnected with a fuse block, which in this embodiment includes an 8 amp fuse 72 connected in series to the operative portion of the circuit 50 at node 74. The circuit 50 according to this embodiment includes a flasher unit 76 connected from node 74. The flasher unit 76, according to this embodiment, can comprise a bimetallic strip flasher of conventional design operating at 12 volts. Typically, such flashers, in a de-energized state, form a closed circuit. As current flows through the flasher, a bimetallic connecting strip heats, due to resistance, causing the strip to bend which, in turn, causes the circuit to break. The circuit remains broken until the bimetallic strip cools sufficiently to again close the circuit. The resulting opening and closing of the circuit causes a periodic on-off-on flash pattern.

The flasher unit 76 according to this embodiment also generates an audible signal. The audible signal can comprise a clicking of the type normally associated with a directional signal. To this end, the flasher can be located within the vehicle passenger compartment, or alternatively, can be remotely positioned, and can include a remote unit (not shown) within the vehicle passenger compartment that generates the audible signal.

It should be noted that while an electromechanical flasher unit 76 is utilized according to this invention, a variety of solid state devices are also contemplated for use as flasher units.

The flasher unit 76 is interconnected at node 80 to the directional control circuit 82, according to this embodiment, and to a hazard switch 84. A hazard switch is typically incorporated into modern vehicles. The hazard switch 84 allows all four marker lights 52, 54, 56 and 58 plus both the instrument indicator lamps 60 and 62 to flash simultaneously. Since the hazard switch 84 is, generally, contemplated as not dependent upon the automobile ignition switch, it is, thus, connected directly to the flasher unit 76.

Directional signal controls, however, according to most conventional designs, are dependent upon the ignition switch being activated. Hence, an ignition switch relay 86, that closes the circuit upon activation of the vehicle ignition switch (not shown), is incorporated between the directional signal control circuit 82 and node 80, according to this embodiment.

The directional signal control circuit 82 is essentially a series of timed gates that open and close the flasher circuit on demand. In a prior art design, such as that depicted in FIG. 1, the directional signal control switches would comprise a double pole switch or pair of single pole switches interconnected with the control stalk. The directional control circuit 82 according to this embodiment replaces the control stalk switches and would, typically, be interposed in The location of the circuit formerly occupied by the stalk switches.

The directional control circuit 82 according to this embodiment comprises two left hand switch/timer blocks 88 and 90 and two right hand switch blocks 92 and 94. The switch/timer blocks 88, 90, 92 and 94 provide timed closing of the overall system circuit 50 to route current to one of the left hand or right hand sets of lamps, 52, 56 and 60 or 54, 58 and 62, respectively. Current is routed to the left hand lamps 52, 56 and 60 via node 93 and to the right hand lamps via node 95. As depicted, each of the left hand and right hand switch pairs 96 and 98, respectively, include a 15 second switch/timer block 88 and 92 and a 70 second time switch/timer block 90 and 94. The use of these switch/timer blocks 88, 90, 92 and 94 will be described further below. However, in summary, the switch/timer blocks each act to select a given set of marker lights and time duration during which such marker lights shall flash. Each of the switch/timer blocks is powered independently by a direct connection via line 99 to the fuse box at node 74 and by an independent connection to the common ground 66.

It is often desirable to include a flasher cutoff ("completed turn") switch 102 such as the mechanical linkage utilized in connection with more conventional control stalk designs. Accordingly, an optional double pole switch is provided between each of the left and right turn signal circuits. This cutoff switch is interconnected with the steering column in much the same manner as the prior art control stalk. As such, the double pole switch 102 would normally close the circuit, allowing current to flow subject to each switch/timer block 88, 90, 92 and 94. Upon completion of a turn, the completed turn switch 102 would open the system circuit for a given duration, thus prematurely de-energizing the marker and indicator lamps 52, 54, 56, 58, 60 and 62. As such, the duration of the turn signal is no longer than that of a conventional turn signal even if a long duration time for flashing has been selected by the driver.

The completed turn shut-off switch 102 can alternatively be constructed to send a reset signal to the switch/timer blocks 88, 90, 92 and 94. As such, the switch/timer itself shuts off prematurely. Such a reset function is described further below.

Figure 3:
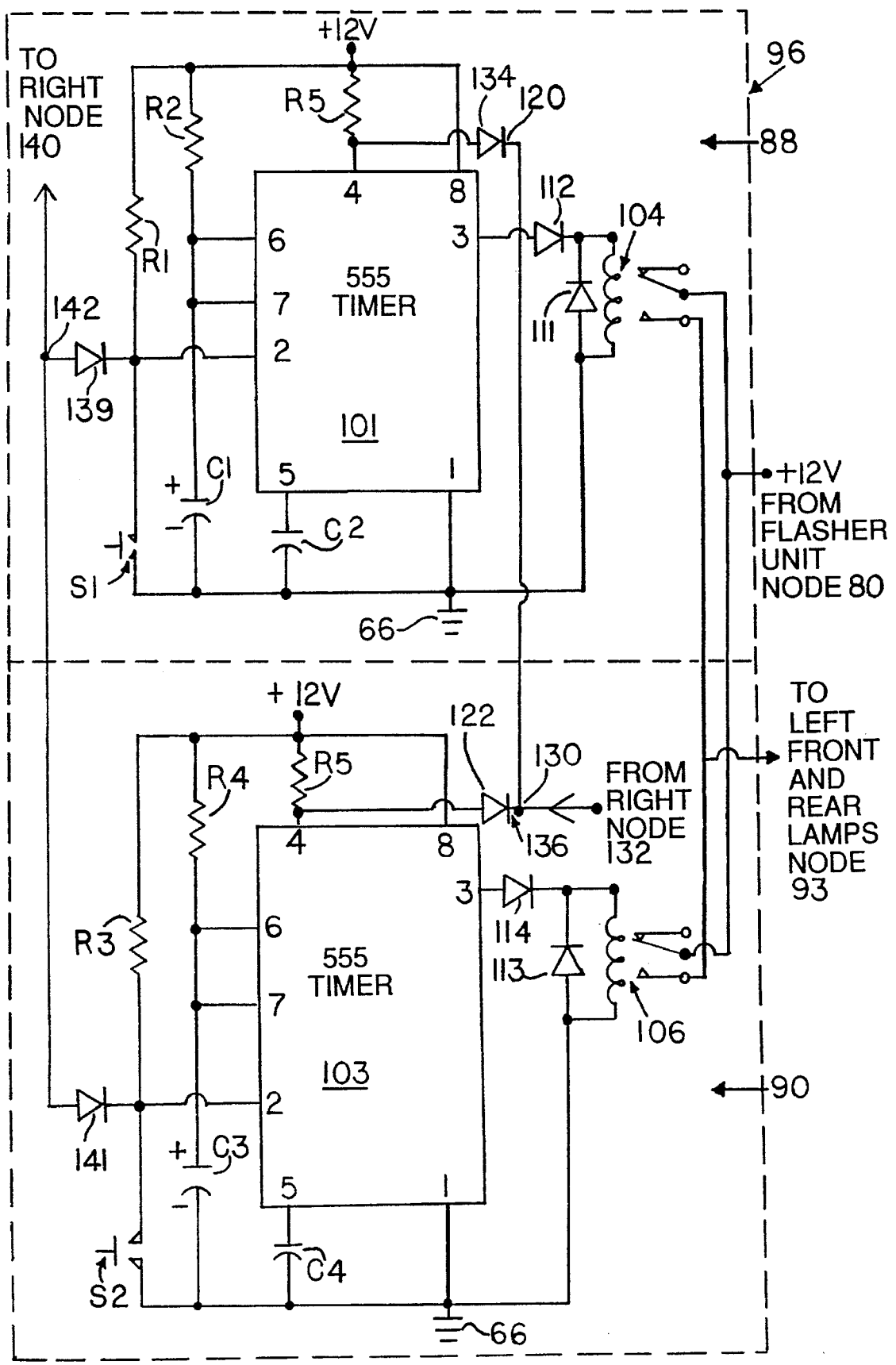
FIGS. 3 and 4 are more detailed schematic diagrams of the left and right directional signal controls of the system of FIG. 2.
Figure 4:
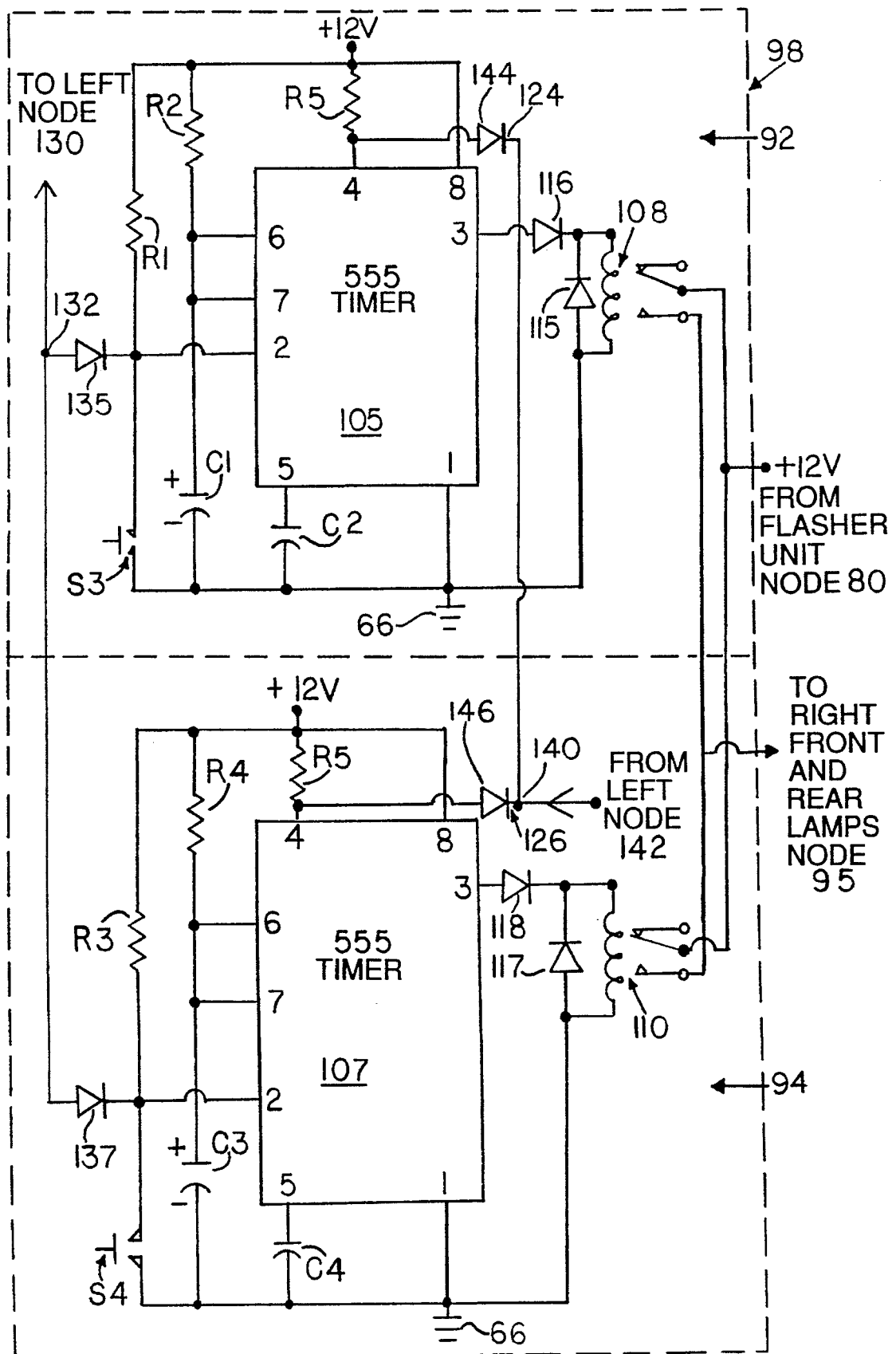

FIGS. 3 and 4 illustrate the left and right pairs 96 and 98, respectively, of switch/timer blocks 88, 90, 92 and 94 of The directional signal control circuit 82 in more detail. The left hand and right hand switch/timer blocks are essentially identical. Thus, for the purposes of this discussion, FIGS. 3 and 4 shall be described simultaneously and identical reference numbers shall be employed where appropriate. As described above, each switch/timer block 88, 90, 92 and 94 is independently powered by the 12-volt power source (battery 64) directed through the fuse 72. Each switch/timer block is also connected to the common ground 66. The left hand switch/timer block pair 96 according to this embodiment comprises a pair of momentary contact single-pole-single-throw switches S1 and S2, while the right hand switches comprise another pair of momentary contact single-pole-single-throw switches S3 and S4. S1 and S3 are interconnected with the 15 second timer block circuits 88 and 92 according to this embodiment. Similarly, S2 and S4 are connected with the 70 second timers according to this embodiment.

The switch/timer block circuits 88, 90, 92 and 94 are each operated by individual 555 timer chips (101, 103, 105 and 107, respectively) which are typically packaged as individual timers on an eight pin DIP. Statistics for this chip can be found in the *Linear Circuit Data Book*, "OpAmps, Comparators, Timers, Regulators, A/D Peripherals" by Texas Instruments Incorporated. The 555 timer chips are each wired substantially conventionally by providing appropriate capacitors and resistors to pins 1–8 as shown. Pin numbering as used herein corresponds to conventional nomenclature utilized, for example, in the *Linear Circuit Data Book*. Specifically, pin 1 is "Ground"; pin 2 is "Trigger"; pin 3 is "Out"; pin 4 is "Reset"; pin 5 is "Control"; pin 6 is "Threshold"; pin 7 is "Discharge" and pin 8 is "$V_{CC}$". Hence, each switch S1–S4 is connected, between ground 66 and the respective timer's trigger (pin 2). When the switch S1–S4 is depressed, the respective timer trigger goes low and the timer is started, causing an "out" signal to generate at its pin 3. This "out" signal lasts for the duration of the timer's cycle and serves to control a respective relay 104, 106, 108 and 110. These relays serve to close the selected flasher circuit. In this embodiment, each of the 15 second switch/timer block circuits 88 and 92 includes the following values as illustrated in FIGS. 3 and 4:

R1=10K Ohms
R2=1M Ohms, C1=10 µf, C2=0.01 µf

For the 70 second switch/timer block circuits 90 and 94, the wiring pattern is essentially identical to that of the 15 second switch/timer block circuits except that:

R3=10K Ohms
R4=470K Ohms, C3=100 µf and C4=0.01 µf.

For each of the 15 second and 70 second timer block circuits 88, 90, 92 and 94, the respective relay 104, 106, 108 and 110 is provided between ground 66 and pin 3 (the timer's "out" terminal) to route power from the flasher unit 76 to the lamps 52, 54, 56, 58, 60 and 62. Each of the relays 104, 106, 108 and 110 can comprise an electromechanical or solid state unit. Each relay is connected to its respective timer "out" pin (pin 3) through a respective diode 112, 114, 116 and 118, comprising an IN 914 diode, according to this embodiment so that current flows unidirectionally through the relay. Another respective IN 914 diode 111, 113, 115 and 117 bridges the relay contacts.

While the 15 and 70 second operation is chosen according to this embodiment for the switch/timer pairs 96 and 98, one or both of the switch/timer blocks in each pair can easily be changed to another value of delay. For example, by changing R4 to 220K Ohms, a delay of approximately 33 seconds is generated. Similarly, R2 and R4 can comprise variable resistors that allow delay times to be programmed as desired. However, standardization of delay times can be preferable in most circumstances and, thus, fixed resistance values are preferred.

As noted above, the system according to this embodiment can include a completed turn off switch that deactivates the timer when a turn has been completed. This switch can operate by signaling the "Reset" pin 4 on each timer. Additionally, it can be desirable to deactivate the timer for one side when the turn signal for the other side has been activated. Otherwise, both signals would operate simultaneously. Hence, each switch/timer block 88, 90, 92 and 94 can include a respective interconnection 120, 122, 124 and 126 to the Reset function (pin 4) on each of the other timers in the system that resets each of the other timers when a particular later-in-time timer is activated. In this manner, the latest-in-time signal receives priority.

The interconnections 120 and 122 to pins 4 of respective left hand timers 101 and 103 (FIG. 3) are joined at node 130. The node 130 is connected to right hand timer "Trigger" pins 2 via node 132 (FIG. 4) of switch/timer block pair 98 (timer blocks 92 and 94). A respective diode 134 and 136 is positioned between each timer "Reset" pin 4 and the node 130. These diodes ensure unidirectional current flow. A respective diode 135 and 137 (FIG. 4) is also positioned between right hand timer "Trigger" pin 2 and node 132. Note that a pull up resistor R5 is positioned between each "Reset" pin 4 and the 12-volt input. This resistor can typically have a 1K Ohm value and serves to maintain the "Reset" pin 4 in a "high" state during normal operation. If one of the left hand timers 101 or 103 is operating while the driver triggers one of the right hand timers 105 or 107, the right switches 53 or 54 transmit a "low" signal via node 132 to node 130 to reset both the left hand timers 101 and 103 to an initial state in which the left hand relays 104 and 106 are "off" and the timers 101 and 103 idle at an initial non-counting state.

Similarly, the interconnections 124 and 126 to pins 4 of respective right hand timers 105 and 107 (FIG. 4) are joined at node 140. The node 140 is connected to left hand timer "Trigger" pins 2 via node 142 (FIG. 3) of switch/timer block pair 96 (timer blocks 88 and 90). A respective diode 144 and 146 is positioned between each timer "Reset" pin 4 and node 142. These diodes also ensure unidirectional current flow. A respective diode 139 and 141 (FIG. 3) is also provided between each of the left hand timer "Trigger" pins 2 and node 142. Pull up resistors R5 having, in this embodiment, a 1K Ohm value are also provided at timer "Reset" pins 4. If one of the right hand timers 105 or 107 is operating while the driver triggers one of the left hand timers 101 or 103, the left hand switches S1 or S2 transmits a "low" signal via node 142 to node 140 to reset both the right hand timers 105 and 107 to an initial state in which the right hand relays 108 and 110 are "off" and the timers 105 and 107 idle at an initial non-counting state.

While not shown, a turn signal reset switch can also be provided to reset each timer if the driver decides not to turn after pressing a given switch S1–S4. Such a function would entail the transmission of a reset signal to pin 4 of each timer 101, 103, 105 and 107. In the depicted embodiment, this is accomplished by routing trigger signals from one timer pair to the Resets of an opposing pair. The 555 timer "Reset" is designed to override "Trigger" so that pressing both side switches simultaneously should reset both side's timers.

Figure 5:
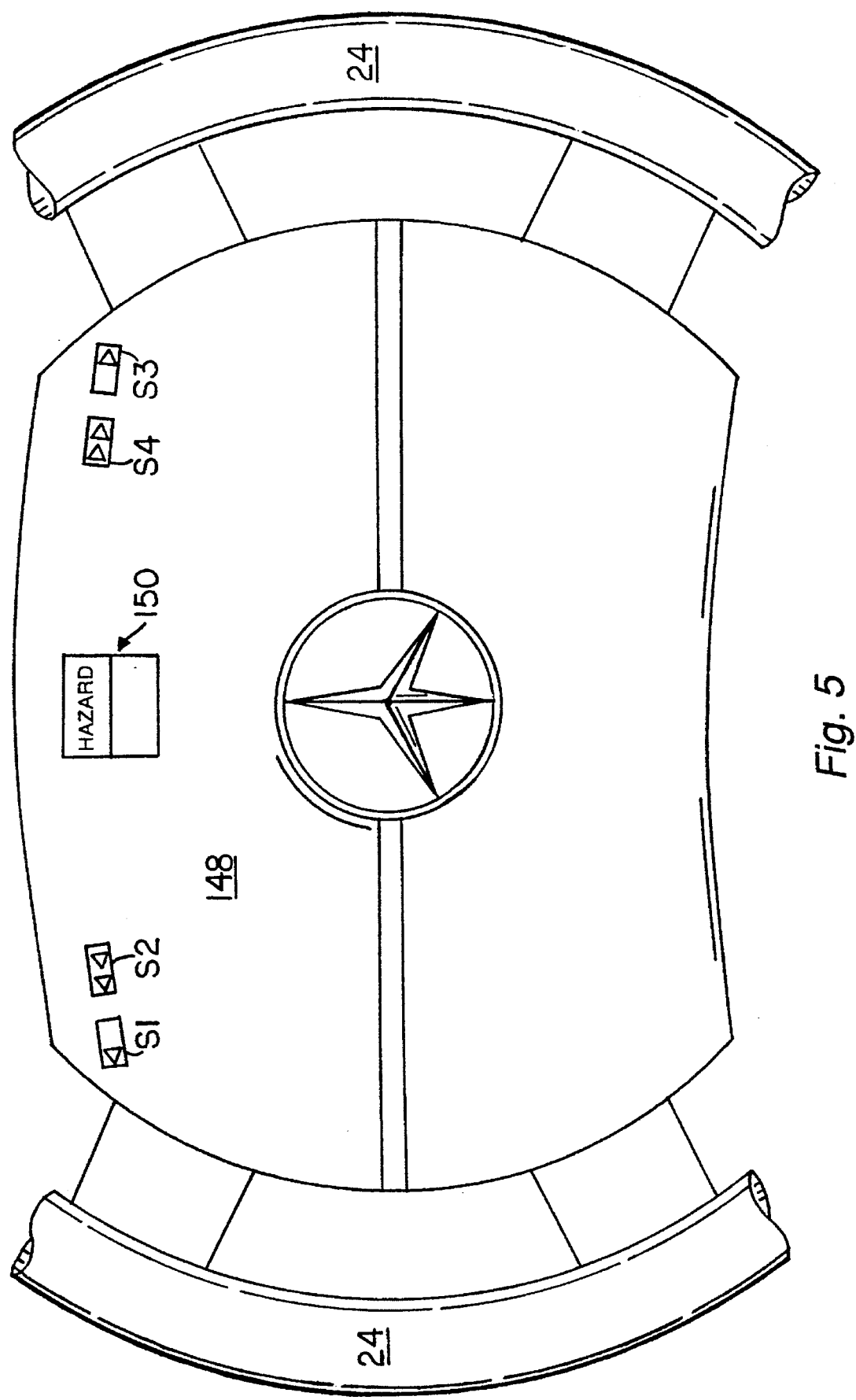
FIG. 5 is a front view of a steering wheel hub having turn signal control switches according to this invention.

FIG. 5 illustrates a steering wheel hub 148 having turn signal controls according to this embodiment. The hub is similar to that shown in the prior art in FIG. 1, except that, at each of the upper left and upper right hand corners of the hub, are included turn signal control switches S1–S4. Each of the 15 second switches S1 and S3 are symbolized by a single arrow while each of the 70 second switches S2 and S4 are symbolized by a double arrow. Similarly, other appropriate indications can be utilized according to this invention. In one embodiment, each of the switches S1–S4 can include an LED or similar illumination that is interconnected with the flasher unit via, for example, the instrument cluster lamp 60 and 62 circuit (FIG. 2), so that they flash, or become continuously illuminated, upon activation. More conventional indicator lamps can also (or alternatively) be provided on the instrument cluster as in the prior art of FIG. 1.

According to this embodiment, a hazard switch 150 is also provided on the hub. However, such placement is not required. An advantage to locating switches S1–S4 on the hub 148 is that the driver need only reach out his or her thumb or other finger without releasing grip on the steering wheel 24 in order to activate the directional signals. It should be noted that such convenient activation of turn signals has not heretofor been practical due to the mechanical interconnection of the control stalk to the steering column. Hence, directional signals according to this embodiment are essentially safer to use than prior art control stalks since the driver need not, at any time, release his or her grip from the steering wheel to operate them.

In operation, the driver decides to initiate a vehicle turn and places his or her finger on the appropriate switch depending upon whether a left turn (S1 and S2) or right turn (S3 and S4) is desired. The short 15 second switches S1 and S3 are generally selected for short duration turns, such as lane changes. The longer 70 second switches S2 and S4 are chosen when the driver anticipates a long wait for a turn such as in a lane change during a traffic jam, or at a long duration traffic light. As noted above, a completed turn cutoff switch can be employed to reset or de-energize the turn signal prematurely, if the turn is completed before the timer completes its cycle. Similarly, the driver can always repress the switch if the turn is not yet completed before, during or after the timer completes its cycle.

Figure 6:
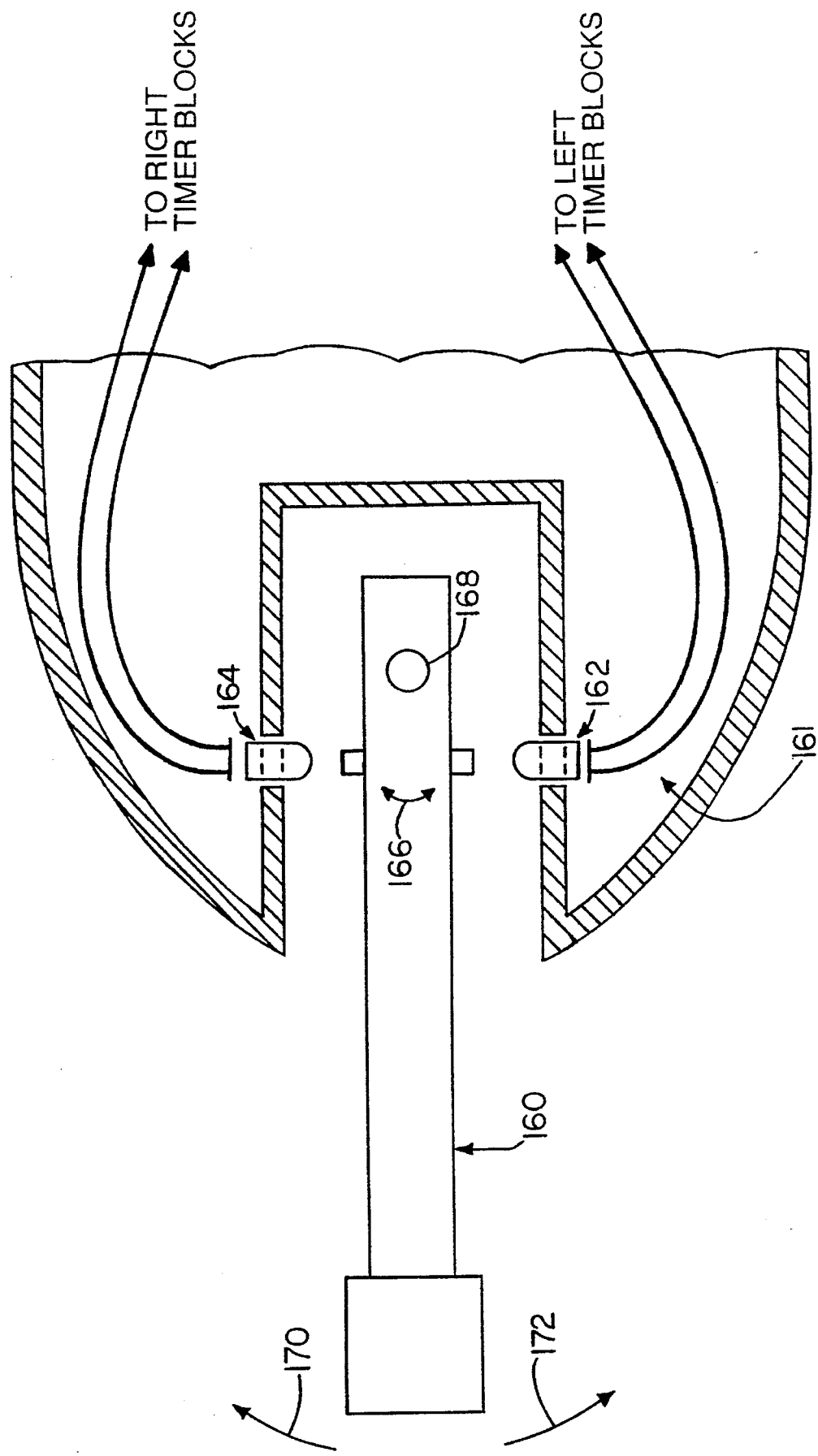
FIG. 6 is a schematic view alternative embodiment of a turn signal control switch arrangement according to this invention.

Alternatively, if a driver desires more traditional turn signal controls, the timer functions according to this invention can be incorporated into a turn signal control stalk. A schematic illustration of one control stalk embodiment is shown in FIG. 6. A variety of configurations are contemplated according to this invention. In this embodiment, the control stalk 160 is mounted on a steering column 161, and includes a set of momentary contact switches 162 and 164 that, when the control stalk is pivoted on its axis 168 in a given direction (double arrow 166), are depressed by the stalk 160 to activate the corresponding timers which can comprise the blocks 88, 90, 92 and 94 of FIGS. 3 and 4. Hence, an upward (clockwise) movement (arrow 170) would trigger the right hand timer blocks 92 and 94, while a downward (counterclockwise) movement (arrow 172) triggers the left hand timer blocks 88 and 90). According to one possible embodiment, a single tap on the control stalk, in a given direction, can activate the shorter-duration timer while a double tap on the control stalk can activate the longer-duration timer. Such a configuration can be implemented using, for example, a flip flop or relay (not shown) that selects between alternative timer circuits and provides a trigger signal to the one selected. A variety of other systems for selecting long or short duration blocks are also contemplated according to this embodiment. These can include applying a longer duration of pressure to the stalk to select a given timer or providing two positions in each of the upward and downward directions for activating each of the two time durations. Alternatively, a single fixed time duration can be utilized, wherein the switches 162 and 164 can be directly connected to timer chips.

Additionally, the control stalk-mounted embodiment according to this invention can incorporate certain prior art mechanical functions (not shown), such as the locking of the control stalk into an upwardmost or downwardmost position in combination with a timed function. For example, the control stalk can be locked into an activated position, and if a wide turn is completed, the control stalk mechanically moves back to neutral, deactivating the timed signal prematurely. However, if the control stalk is not moved back to neutral within a certain number of seconds, the signal automatically shuts off, via the timer blocks, whether or not the control stalk is returned to neutral. This ensures that a signal does not remain activated if the user forgets to return the control stalk to a neutral position. In such an embodiment, the control stalk shut-off contacts can be interposed in the location of the completed turn signal off switch 102 as shown in FIG. 2. Each of the left and right contacts 180 and 182 (FIG. 2) of the switch would be independently operated by moving the control stalk in a given direction. In other words, a neutral control stalk position would open both the left hand and right hand circuits, while a left turn would close the left hand circuit and a right turn would close the right hand circuit. A momentary contact switch such as S1 and S3 would be incorporated into the control stalk and would be activated when the control stalk is brought into a left turn or right turn orientation. At this time, the left or right turn signal would deactivate when either the timer ran its cycle or the control stalk returned to neutral.

The foregoing has been a detailed description of a preferred embodiment. Various modifications and additions can be made without departing from the spirit and scope of the invention. For example, the switch/timer blocks and overall system circuitry can also be implemented using analog circuitry or microprocessors having software control. Similarly, a single timer chip can be utilized according to this embodiment, wherein the control signals for each side of the vehicle are selectively routed through the single timer chip and timer duration is variable for the single chip. This description, therefore, is meant to be taken only by way of example and not to otherwise limit the scope of the invention.

What is claimed is:

1. A directional indicator system for an automobile comprising:

a steering wheel operatively interconnected with front wheels of the automobile for steering the front wheels;

a flasher unit;

left-hand marker lamps;

right-hand marker lamps;

a timer circuit and a control switch circuit interconnected with each of the flasher unit, the left-hand marker lamps and the right-hand marker lamps, the control switch circuit and the timer circuit being constructed and arranged so that operation of the control switch circuit causes the timer circuit to thereby cause one of the left-hand marker lamps and the right-hand marker lamps to flash in response to the flasher unit for a first predetermined time; and a completed turn cut-off switch operatively connected with the steering wheel and constructed and arranged so that movement of the steering wheel from a turning position to a neutral, substantially-straight-steering position causes at least one of the left-hand marker lamps and the right-hand marker lamps to cease flashing at a time that is less than the first predetermined time.

2. The system as set forth in claim 1 wherein the control switch circuit includes an elongated control stalk mounted adjacent the steering wheel and movable to a plurality of positions to select one of the left-hand marker lamps and right-hand marker lamps to flash for the first predetermined time.

3. The system as set forth in claim 1 wherein the timer circuit is further constructed and arranged so that operation of the control switch circuit further causes the timer circuit to select one of the left-hand marker lamps and the right-hand marker lamps to flash in response to the flasher unit for a second predetermined time that is longer than the first predetermined time and wherein the completed turn cut-off switch is constructed and arranged to cause at least one of the left-hand marker lamps and the right-hand marker lamps to cease flashing at a time that is less than one of the first predetermined time and the second predetermined time.

4. The system as set forth in claim 3 further including a control stalk mounted adjacent the steering wheel, wherein the timer circuit is constructed and arranged so that movement of the control stalk to engage at least one of the contacts a plurality of times causes the timer circuit to cause one of the left-hand marker lamps and the right-hand marker lamps to flash in response to the flasher unit for the second predetermined time.

5. A directional indicator system for automobiles comprising:

a steering wheel operatively interconnected with front wheels of the automobile for steering the front wheels including a steering wheel support column for supporting the steering wheel thereon;

a flasher unit;

left-hand marker lamps mounted on a body of the automobile;

right-hand marker lamps mounted on a body of the automobile;

a timer circuit and a control switch circuit interconnected with each of the flasher unit, the left-hand marker lamps and the right-hand marker lamps, the control switch circuit and the timer circuit being constructed and arranged so that operation of the control switch circuit causes the timer circuit to thereby cause select one of the left-hand marker lamps and the right-hand marker lamps to flash in response to the flasher unit for a first predetermined time; and a control stalk, interconnected with the control switch circuit, the control stalk including an elongated shaft extending from the support column and having contacts adjacent the support column, the control stalk being movable to a plurality of positions to selectively engage the contacts to select one of the left-hand marker lamps and the right-hand marker lamps to flash for the first predetermined time.

6. The system as set forth in claim 5 further comprising a completed turn cut-off switch operatively connected with the control stalk and the steering wheel and being constructed and arranged so that movement of the steering wheel from a turning position to a neutral, substantially-straight-steering position, causes each of the left-hand marker lamps and the right-hand marker lamps to cease flashing at a time that is less than the first predetermined time.

* * * * *